US008734009B2

(12) United States Patent
Kelly et al.

(10) Patent No.: US 8,734,009 B2
(45) Date of Patent: May 27, 2014

(54) SYSTEM AND METHOD FOR DETERMINING THE STATE OF A BEVERAGE

(75) Inventors: Jason Morgan Kelly, Arvada, CO (US); Ray Alan Toms, Golden, CO (US); Charles Ho Fung, New Berlin, WI (US)

(73) Assignee: Millercoors, LLC, Golden, CO (US)

( * ) Notice: Subject to any disclaimer, the term of this patent is extended or adjusted under 35 U.S.C. 154(b) by 233 days.

(21) Appl. No.: 13/312,796

(22) Filed: Dec. 6, 2011

(65) Prior Publication Data
US 2013/0145324 A1 Jun. 6, 2013

(51) Int. Cl.
G01K 1/08 (2006.01)
G01K 1/16 (2006.01)
G01K 11/00 (2006.01)
G01J 5/00 (2006.01)

(52) U.S. Cl.
USPC ............. 374/45; 374/141; 374/120; 374/121; 374/161; 250/338.1

(58) Field of Classification Search
None
See application file for complete search history.

(56) References Cited

U.S. PATENT DOCUMENTS

| 5,583,337 | A * | 12/1996 | Chan .............................. 250/330 |
| 6,382,125 | B1 * | 5/2002 | Tamura .......................... 116/207 |
| 2005/0258250 | A1 | 11/2005 | Melick et al. |
| 2006/0086745 | A1 | 4/2006 | Morrison |
| 2006/0182165 | A1 | 8/2006 | Tapelt-Glaser |
| 2006/0185372 | A1 | 8/2006 | Hinojosa |
| 2006/0249949 | A1 | 11/2006 | Fortune |
| 2007/0059837 | A1 | 3/2007 | Heilmann et al. |
| 2007/0071680 | A1 | 3/2007 | Ribi |
| 2007/0138289 | A1 | 6/2007 | Melick et al. |
| 2007/0212501 | A1 | 9/2007 | Wolfe et al. |
| 2008/0043804 | A1 | 2/2008 | Goldsmith et al. |

(Continued)

FOREIGN PATENT DOCUMENTS

| JP | 2007-090071 | 4/2007 |
| WO | WO 2011/089049 | 7/2011 |
| WO | WO 2011/091444 | 7/2011 |

OTHER PUBLICATIONS

International Search Report and Written Opinion for International (PCT) Application No. PCT/US2012/067675 mailed Feb. 27, 2013, 22 pages.
"Beer Timer for iPhone," blueHula Studios, Nov. 17, 2011, [retrieved on Jan. 23, 2013], 7 pages. Retrieved from: udm4.com/iPhone/Beer_Timer-701170.

(Continued)

*Primary Examiner* — Lisa Caputo
*Assistant Examiner* — Brandi N Hopkins
(74) *Attorney, Agent, or Firm* — Sheridan Ross PC

(57) ABSTRACT

A system, method and device determine the state of a beverage and communicate information regarding the beverage. A communication device runs an application that determines the start temperature of the beverage to be cooled and sets a desired end temperature. Thermochromatic inks are used on the container label or packaging of the container to convey temperature information. A camera of the communication device senses temperature information of an image of the container. The application then determines an amount of time for cooling the beverage also taking into consideration the type and size of container. The beverage is placed in a cooling device, a timer is initiated by the user, and the application later generates a message indicating the beverage has reached the desired end temperature. The user may link information generated from the application to social networking sites for purposes such as generating invitations to friends within the social network.

20 Claims, 9 Drawing Sheets

(56) References Cited

U.S. PATENT DOCUMENTS

2008/0121728 A1   5/2008   Rodriguez
2010/0111370 A1   5/2010   Black et al.
2010/0138344 A1   6/2010   Wong et al.
2011/0185764 A1*  8/2011   Kelly ......................... 62/457.2
2011/0253577 A1  10/2011  Masciambruni

OTHER PUBLICATIONS

Heilmann "Camera Phone Based Indicator Application." Research and development activities in printed intelligence, Dec. 2009, VTT Technical Research Centere of Finland 2009, pp. 27-28.

* cited by examiner

MALT BEVERAGE
COOLING DEVICE: FREEZER AT 0°F

| 12oz Can | | 12 oz Bottle | | 16oz Al Pint | | 16oz Can | | 24oz Can | |
|---|---|---|---|---|---|---|---|---|---|
| Start Temp - End Temp (F) | Time (min) | Start Temp - End Temp (F) | Time (min) | Start Temp - End Temp (F) | Time (min) | Start Temp - End Temp (F) | Time (min) | Start Temp - End Temp (F) | Time (min) |
| 90 - 38 | 65 | 90 - 38 | 67 | 90 - 38 | 69 | 90 - 38 | 84 | 90 - 38 | 89 |
| 70 - 38 | 43 | 70 - 38 | 48 | 70 - 38 | 47 | 70 - 38 | 59 | 70 - 38 | 61 |
| 50 - 38 | 19 | 50 - 38 | 17 | 50 - 38 | 17 | 50 - 38 | 21 | 50 - 38 | 22 |
| 45 - 38 | 10 | 43 - 38 | 12 | 45 - 38 | 14 | 45 - 38 | 17 | 45 - 38 | 16 |
| 90 - 27 | 120 | 90 - 27 | 101 | 90 - 27 | 125 | 90 - 27 | 117 | 90 - 27 | 133 |
| 70 - 27 | 98 | 70 - 27 | 82 | 70 - 27 | 103 | 70 - 27 | 92 | 70 - 27 | 105 |
| 50 - 27 | 74 | 50 - 27 | 51 | 50 - 27 | 73 | 50 - 27 | 65 | 50 - 27 | 74 |
| 45 - 27 | 53 | 43 - 27 | 36 | 45 - 27 | 51 | 45 - 27 | 51 | 45 - 27 | 60 |

FIG. 13

Recommended Set Times

| Initial Package Temp | Time to 38F (Range) | 12oz Can (min) | 12oz Bottle (min) | 16oz Pint Timer (min) | 16oz Can Timer (min) | 24oz Can Timer (min) |
|---|---|---|---|---|---|---|
| 90F | 65-69 | 65 | 65 | 70 | 85 | 90 |
| 70F | 43-48 | 45 | 45 | 50 | 60 | 60 |
| 50F | 17-19 | 15 | 15 | 20 | 20 | 20 |
| 43-45F | 10-14 | 10 | 10 | 15 | 15 | 15 |

| Initial Package Temp | Time to 38F (Range) | Time to 27F (Range) | 38°F Super Cold Color | 42°F Cold Color | 70°F Room Temp Color |
|---|---|---|---|---|---|
| 90F | 65-69 | 101-120 | Clear | Clear | Clear |
| 70F | 43-48 | 82-103 | Clear | Clear | |
| 50F | 17-19 | 51-74 | Clear | Clear | |
| 43-45F | 10-14 | 36-53 | Clear | | |
| 39-42F | 7-10 | 21-29 | Clear | | |
| 35-38F | — | 15-20 | | | |

SYSTEM AND METHOD FOR DETERMINING THE STATE OF A BEVERAGE

FIELD OF THE INVENTION

The present invention relates to a system and method for determining the state of a beverage, and more particularly, a method and system that enables a consumer to determine and achieve a desired temperature for serving a beverage. In another aspect of the invention, it includes a method of communicating the status of the beverage through a social networking system for generating communications of a social event that will include serving of the beverage.

BACKGROUND OF THE INVENTION

Many beverages achieve their optimum characteristics when served at a particular temperature or temperature range. For example, with some malt beverages, enhanced flavor and overall beverage performance can be realized if the beverage is served within a known temperature range. It is well known that, particularly for malt beverages, it is advantageous to serve the beverage at a cooled temperature in order to maximize the flavor characteristics of the beverage. However, for impromptu parties or other short notice social events, a consumer may not have enough time to cool the beverage within a standard cooling device such as a refrigerator. In other circumstances, a consumer may wish to cool the beverage beyond the set temperature of the user's refrigerator. For example, the user may wish to "super cool" the beverage to near the freezing point of the beverage.

Once solution that consumers attempt for quick cooling or super cooling is to place the beverage within the freezer portion of the refrigerator. However, if the beverage is not timely retrieved, the expansion of the beverage as it freezes causes the container to leak. Further, once the beverage achieves its freezing temperature, the beverage will quickly freeze making the beverage unsuitable for consumption. Further, substantial freezing of the beverage can harm the flavor of the beverage as well as its appearance.

Therefore, there is a need to provide a system and method for effectively cooling a beverage with standard cooling devices such as freezer portions of refrigerators, without the consumer experiencing the negative effects of rupturing of the beverage container and freezing of the beverage making it unfit for consumption. There is also a need to achieve these goals with a relatively simple and inexpensive solution, and one that is readily available to many consumers.

In the field of mobile communication devices, many device applications or "apps" have been developed to provide a user with functional benefits based upon the capabilities of the mobile device. Typically, a mobile device will include not only a capable microprocessor that enables a user to run many device apps simultaneously, but also the mobile devices includes a camera/video camera that is capable of taking high resolution pictures and videos. Mobile communication devices have become quite popular, particularly for their ability to provide both a wide array of apps and a gateway for participating in social networks.

Considering the broad functional capabilities of a mobile device, it would therefore be advantageous if a mobile device could also perform the unique function of determining the state of a beverage along with the capability to communicate the state of a beverage within a social network for determining the timing of a social event or to provide a means to generate a social invitation.

SUMMARY OF THE INVENTION

In accordance with the present invention, a system and method for determining the state of the beverages are provided. According to the method, a user takes advantage of a mobile device app which is capable of determining the start temperature of a beverage, and then communicates to a consumer when the beverage will achieve its optimum cooled temperature after it has been placed in a cooling device such as the freezer portion of a refrigerator.

In another related aspect of the invention, it includes a system in which the mobile device has a beverage monitoring or status app that determines the start or beginning temperature of a beverage, and then determines when the beverage will reach its optimum temperature taking into consideration many variables such as the type of beverage, size and type of the container, the start temperature of the beverage, and the desired end temperature. The mobile device then issues the signal or message to the user indicating that the beverage is ready for consumption.

In yet another aspect of the invention, the method involves the use of the mobile device acting as a means of communication for the consumer to communicate the state of the beverage to other parties within a social network. For example, the consumer could have a scheduled party, or an impromptu, non-scheduled party in which the user wishes to contact various friends within the network for purposes of having a social event. The mobile device is used to communicate the invitation to the social event, and to advise the participants as to a particular timeframe when the beverages to be consumed at the social event are ready for consumption. One further detail of this particular example may include an impromptu invitation to a party to watch a sporting event on television in which the user generates an invitation to selected social network friends. Thus, the user initiates the beverage monitoring or status app of the mobile communication device and then issues invitations to the friends within the network advising them as to details for the social event, to include the type of beverage to be served and when the beverage will be ready for consumption.

With the system of the invention, it more specifically includes a mobile communication device, such as smart phone, which has the capability to wirelessly communicate with other mobile communication devices through a communications network such as the Internet. The mobile device has a standard configuration including the capability through its microprocessor to run various apps, to include an app especially created for achieving the functionality of the method. The mobile device further includes a camera that is capable of distinguishing colors. A temperature indicating medium such as one or more thermochromatic inks are applied to the beverage container or the label or packaging of the container. The ink(s) are activated at pre-determined temperatures, and the activated ink colors corresponding to known temperatures. The camera of the mobile device captures the color information, compares it to data stored in the app regarding recommended set times for chilling of the beverage. The app is then capable of generating information regarding when the beverage will be ready for consumption to therefore avoid inadvertent freezing of the container.

With the method of the invention, it more specifically includes a process in which a user first determines one or more beverages that the user wishes to cool. The user takes a picture of the beverage with the camera of the mobile device to capture color information of the temperature indicating medium(s) on the container, or the user performs some other function with the camera to capture the color information such as aligning the temperature indicating medium with a control or calibration image displayed by the app for a period of time so the camera imager may detect the color(s) and then translate this color information into a recommended set time for cooling. In a preferred embodiment, the label of the beverage may include one or more thermochromatic inks that have predetermined activation temperatures therefore corresponding to known temperatures of the container. When the user takes the picture of the beverage container or otherwise uses the camera imager to obtain the color information of the inks, the color(s) detected by the camera imager is recorded, and logic within the app determines an estimated time in which the beverage will be cooled to the temperature selected by the consumer. Once the consumer confirms that the mobile device has determined the starting temperature of the beverage, the user may then place the beverage into the cooling device, and the app will start a timer visible to the user indicating how much time remains before the beverage will be cooled. When the timer has timed-out, the mobile device generates a signal to the consumer advising that the beverage is ready for consumption.

Multiple thermochromatic inks can be used enabling the user to precisely select the desired temperature for consuming the beverage. Logic within the app accounts for many factors to include the type of beverage, the type of beverage container, the size of the beverage, and the particular cooling device in which the beverage is cooled. Each of these factors may affect the time required to cool the beverage, and therefore data in the app as discussed below may include tabular data that allows the app to quite accurately determine when the beverage will be cooled. The app also has a factor of safety in the app calculations to ensure the beverage does not freeze by establishing set times that take into account earliest potential freeze times.

Ambient lighting conditions may affect the camera imager's capability to detect color. For example in low-light conditions, the imager may not be able to adequately detect colors. Therefore according to another feature of the invention, it is contemplated that the app have the capability to generate an output causing the onboard camera flash to activate when low-light or other improper lighting conditions exist.

According to the social networking aspect of the invention, simultaneous with executing the mobile device app for cooling the beverage, the user can communicate through the mobile device an invitation to friends in the social network to attend the social function, and the mobile device app alarm indicating that the beverage is ready can also be simultaneously communicated to those friends who have been invited to the social event. To enhance the invitation and to otherwise enhance the social event to be attended, the mobile device can generate video or audio signals that signify that the friends should now move to attend the social event, or should otherwise respond to the alarm.

In addition to thermochromatic inks, there are a number of other inks that could be considered for use wherein the camera of the mobile device may be capable of determining and discriminating the particular state(s) of the inks. For example, other inks that could be used on the beverage container include photochromatic ink, infrared ink, luminescent ink, hydrochromatic ink, time-developing inks, iridescent/reflective inks, lenticular inks, and holographic inks. It is also contemplated that one or more combinations of these inks can be used with the invention enabling accurate and precise temperature detection.

In summary, the invention in one aspect includes a method of cooling a beverage to a desired temperature. In another aspect of the invention, it includes a system for cooling a beverage, to include the use of a communication network and one or more mobile communication devices. In yet another aspect of the invention, it includes a mobile communication device with an application especially adapted for determining the state of a beverage, and providing various user interfaces that enable a user to determine when a beverage is cooled to a desired temperature. In yet another aspect of the invention, it includes a software application for use in a computer or mobile communication device wherein the software application provides functionality for a user to determine the state of a beverage and then to cool the beverage to a desired temperature. In yet another aspect of the invention, it includes the use of the mobile device acting as a means of communication for the consumer to communicate the state of the beverage to other parties within a social network.

These features and advantages of the invention along with others will become more apparent from a review of the following detailed description taken in conjunction with the drawings.

BRIEF DESCRIPTION OF THE DRAWINGS

FIG. 13 is a table of temperature information that provides a basis for determining when a beverage is ready for consumption considering factors to include the type of beverage, the type of beverage container, and size of the container. This table comprises but one set of temperature data that can be stored and used by the app of the invention;

DETAILED DESCRIPTION

Figure 1:
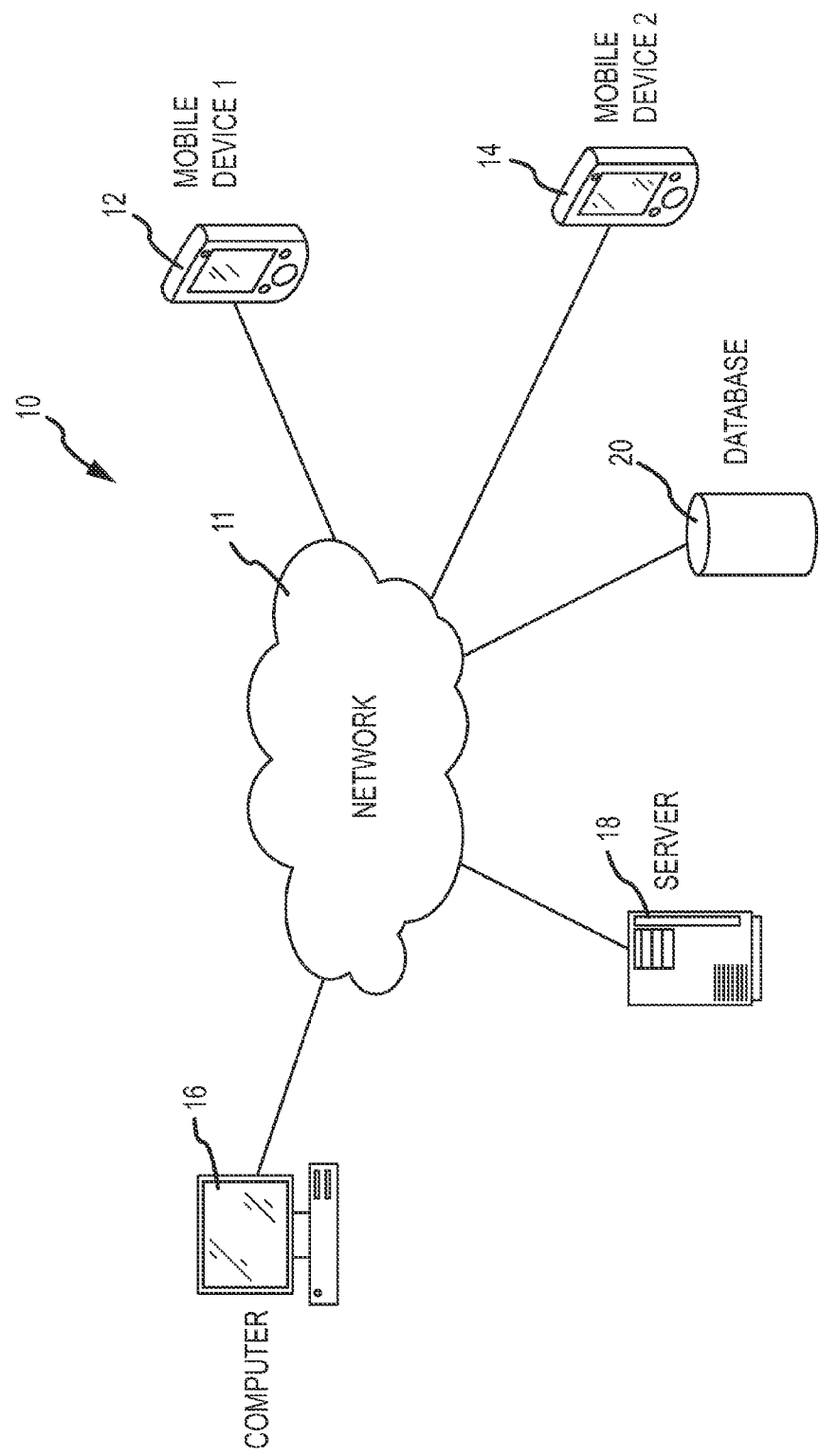
FIG. 1 is a schematic diagram of a communications network including a plurality of mobile devices and/or a computer workstation that may be used as the primary means of communication for achieving a method of the invention.

Referring to FIG. 1, an example communications system 10 is illustrated that provides the environment for the system and method of the present invention. Within the communications system 10, it may include one or more mobile communication devices 12 and 14, one or more computers 16 such as stand-alone work stations, and one or more servers 18 that may be used to facilitate communications between the computer/communication devices. One or more databases 20 are provided, such as databases to service storage of data for the server(s) 18, or other databases which can be associated with the mobile devices 12 and 14 or computer 16 that store information regarding the application running on the mobile devices or computers that achieve the functionality of the method and system. A communication network 11, such as the Internet, or other selected communication networks, enables connectivity between the mobile devices, computer and server. The computer 16 is intended to represent a general purpose computer (including, merely by way of example, personal computers and/or lap top computers running various versions of Microsoft® or Apple® operating systems) and/or workstation computers running any or a variety of commercially available UNIX or UNIX operating systems. The computer 16 may also have any of a variety of other applications, including for example, database client and/or server applications and web browser applications. As mentioned, the computer 16 may also be running a particular application associated with the method of the present invention.

For the mobile devices 12 and 14, these are intended to represent Internet enabled mobile telephones, and/or personal digital assistants capable of communicating via a network, and displaying and navigating web pages or other types of electronic documents. The mobile devices can be, for example, Apple I Phones®, Android® phones, among many other commercially available mobile communications devices.

With respect to the network 11, it may be any type of network familiar to those skilled in the art that can support data communications using a variety of available protocols, including without limitation, TCP/IP, SNA, IPX, AppleTalk®, and the like. By way of example, the network 11 may be the Internet, a local area network (LAN), a virtual private network (VPN), an intranet, and extranet, a public switched telephone network (PSTN) an infrared network, or a Bluetooth wireless network to include any network operating under any of the IEEE802.11 suite of protocols.

For the server 18, this may be a web server that can be used to process requests for web pages or other electronic documents from the computer 16 and mobile devices 12 and 14. The web server can run an operating system including any of those discussed above, as well as any commercially available server operating system. The server 18 can also run a variety of server operations including HTTP servers, FTP servers, CGI servers, database servers, Java® servers and the like. In some instances, the server may publish operations available as one or more web services. The server 18 may also represent an application server that, in addition to running an operating system, can include one or more applications accessible by a client operating one or more of the computer or mobile communication devices. Thus, the server may be one or more general purpose computers capable of executing programs or scripts in response to requests from the computer 16 or mobile devices 12/14.

The database 20 can, for example, be a database server, including those which may be commercially available from Oracle®, Microsoft®, IBM®, and the like that can process requests from clients on the system. Further, the database 20 may reside in a variety of locations and therefore, can be multiple databases. The database 20 may reside on a storage medium local to one or more of the computers 16 and mobile devices 12 and 14. Alternatively, the database 20 may be remote from any or all of the mobile devices and computers, while the computers and mobile devices have their own separate databases. In one embodiment, the database 20 may be a relational database, such as an Oracle® 10I database, that is adapted to store, update and retrieve data in response to SQL commands.

With respect to an application that runs on the computer 16 and mobile communication devices 12 and 14, the application is preferably a software or firmware module, but in any event the application could be any known or later developed hardware, software, firmware, artificial intelligence, fuzzy logic, or combination of hardware and software that is capable of performing the functionality associated with the method of the present invention.

Figure 2:
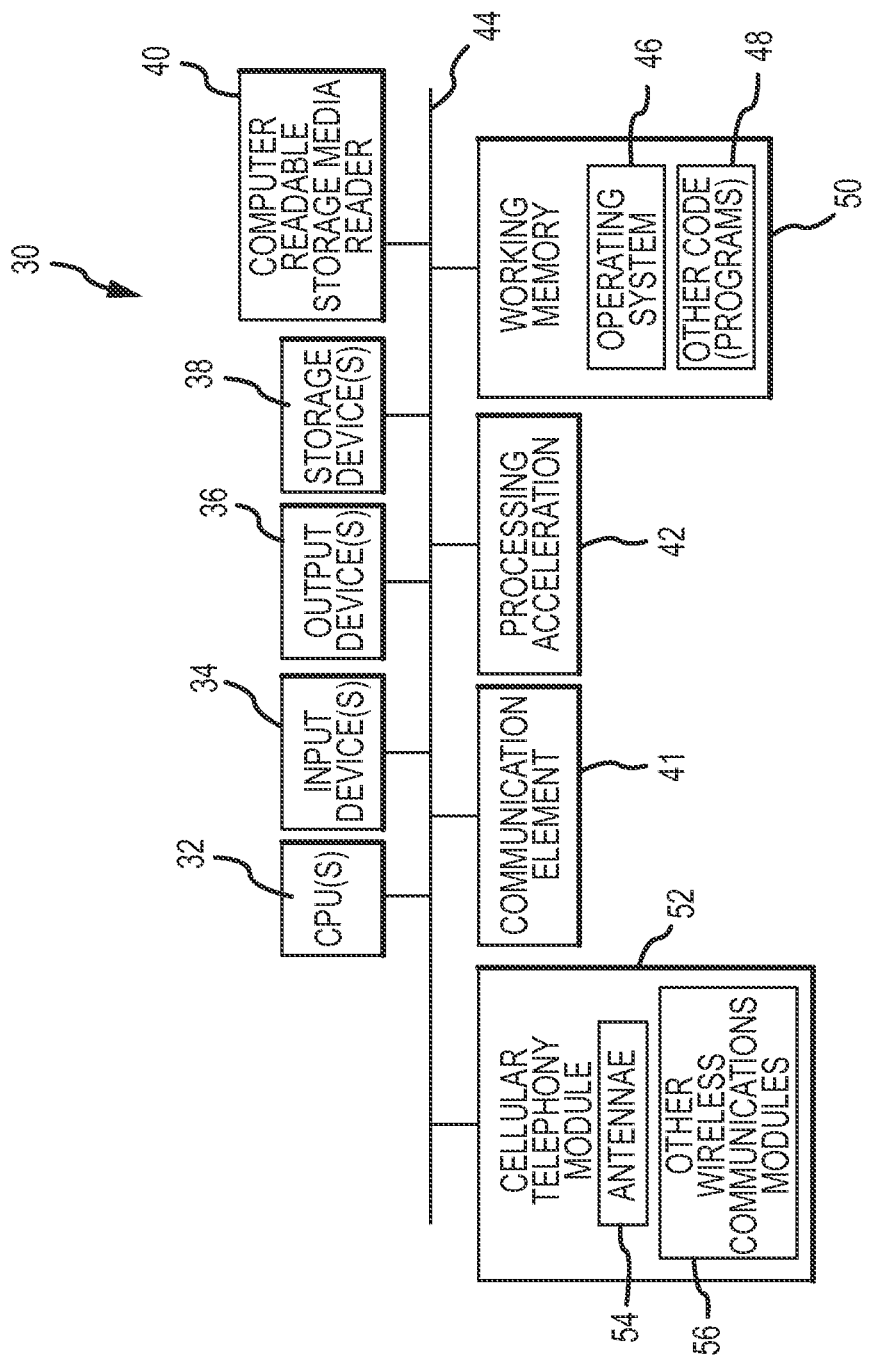
FIG. 2 is a schematic diagram illustrating components of a general purpose computer and a standard wireless communication device.

Referring to FIG. 2, this figure provides an example of a general purpose computer 30, and the basic elements associated with a general purpose computing device. The mobile devices 12 and 14 as well as the computer 16 are examples of the general purpose computing device 30. The elements of the device 30 are connected to one another via a communications bus 255. The hardware elements may include one or more central processing units (CPUs) 32, one or more input devices 34 (for example, a mouse, keyboard, or a touch-screen). The device 30 also includes one or more storage devices 38 such as disk drives, optical storage devices, solid state storage devices including random access memory (RAM) and/or a read only memory (RAM) that can be programmable, flash updatable, and the like. A computer readable storage media reader 40 is also provided, along with a communications element (such as a modem, a network card that is wireless or wired, and/or an infrared communication device). In some computers, it may also include a process acceleration unit 42 that can include a DSP, or another type of special process server.

The computer readable storage media reader 40 can be also connected to a computer readable storage medium, together (and optionally, in combination with storage devices 38) comprehensively representing remote, local, fixed and/or removable storage devices and storage media for temporary and/or permanently storing computer readable information. The communication element 41 may permit data to be exchanged with the network 11 and/or any other computer described above in the communication system 10. As also shown, the example computer 30 may also comprise software elements, shown as located within a working memory 50, including an operating system 46, and other code 48, such as program code implementing a web service connector or components of a web service connector, and any applications required to achieve the functionality of the method and system of the present invention.

In support of communication functions required for the mobile devices 12 and 14, the FIG. 2 also illustrates a cellular telephony module 52. As an example, the cellular telephony module 52 may comprise a GSM, a CDMA, FDMA and/or an analogue cellular telephony transceiver capable of supporting voice, multimedia, and/or data transfers over a cellular network. Additionally, the device 30 can include other wireless communications modules 56. For example, the other modules 56 can comprise a WIFI, Blue Tooth, WiMax, infrared, or other wireless communications links. The cellular telephony module 52 and the other wireless communication module 56 can each be associated with a shared or dedicated antenna 54.

Figure 3:
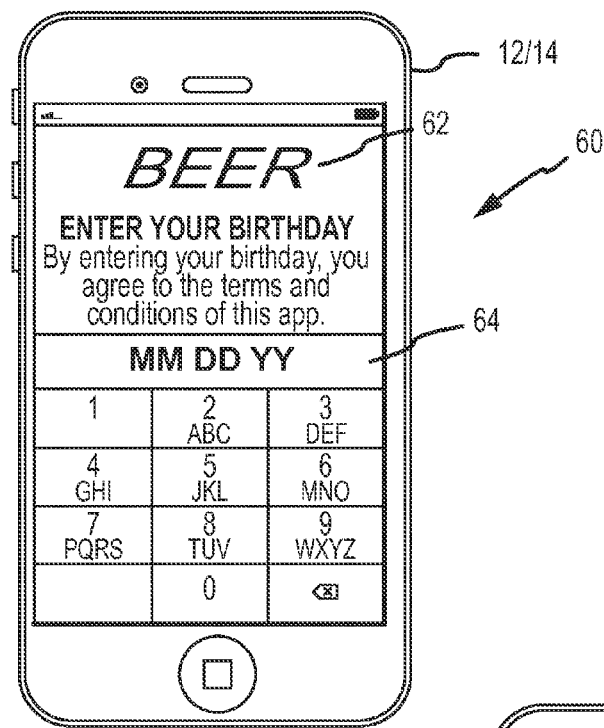
FIG. 3 is an example user interface appearing on a mobile communication device for achieving the functionality of the present invention.

Referring to FIG. 3, a user interface screen 60 is shown which is generated from the software app that is loaded onto the mobile communication devices or computer. For the mobile communication devices 12/14, the user interface screen may be a touch sensitive screen as shown that enables a user to execute inputs by touching the screen. Alternatively, for example with respect to the computer 16, the user interface screen could be displayed on a conventional display screen in which a mouse and/or keyboard are used to generate inputs.

In the particular screen of FIG. 3, it first illustrates the type of beverage which is to be cooled, shown in the FIG. 3 as BEER 62. For alcoholic beverages, various federal/state laws may require an age verification regarding user interaction with promotions associated with such alcoholic beverages. Accordingly, the screen 60 also requires the user to enter an age verification to complete the data entry block 64.

Figure 4:
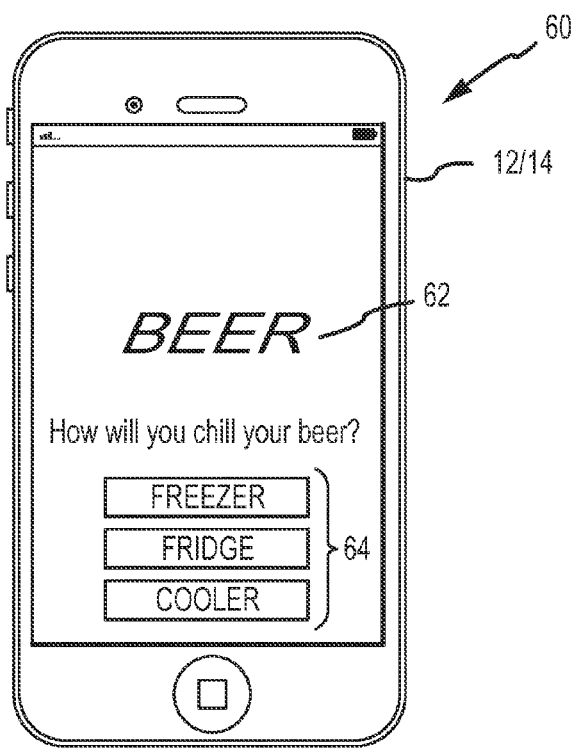
FIGS. 4-12 illustrate additional user interfaces that may appear on the mobile communication device to achieve the functionality of the present invention.

Referring to FIG. 4, another user interface screen is provided that assumes the user was able to provide the proper age verification. In this screen of FIG. 4, the app requests the user to select the type of device in which the beverage is to be cooled. As shown, the screen provides three options 64, namely, a freezer, a refrigerator, and a cooler. The cooler option may represent a container that holds an amount of ice. The freezer option may represent a stand-alone freezer used to freeze consumables, and could be, for example, a separate freezer, or the freezer portion of a refrigerator. The fridge option may represent a standard refrigerator that has one or more compartments to cool consumables, and the refrigerator is typically held at some temperature above freezing.

Figure 5:
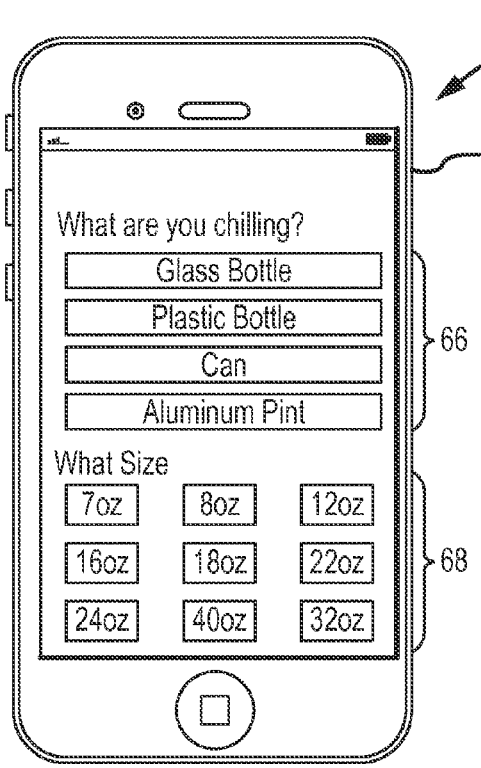

After the user selects the type of device to chill the beverage, another user interface is provided as shown in FIG. 5 that requests the user to select the type of beverage container that holds the beverage to be cooled. The beverage options 66 include a glass bottle, a plastic bottle, a can, or an aluminum pint container. The screen of FIG. 5 also provides the user with container size options 68, and the user also selects the corresponding size of the container. Common sized container options are provided in the user interface screen, however it shall be understood that the screen can be modified to provide other options in terms of other types of containers and sizes.

Figure 6:
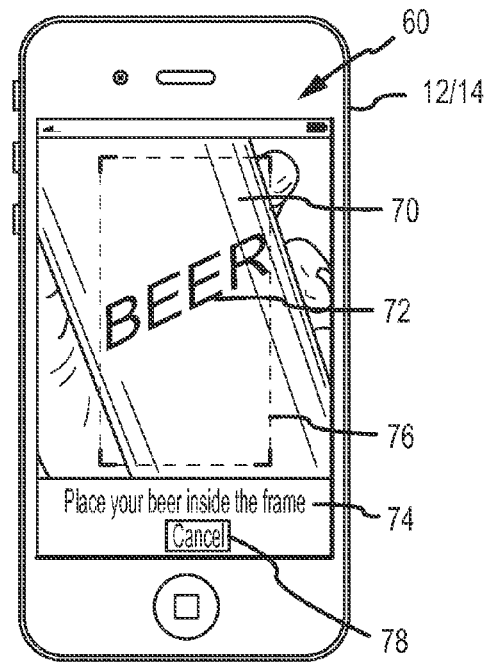

Referring now to FIG. 6, after the user makes the container and size selections, another user interface screen is provided to enable capture of an image of the container that has the ink(s) applied thereto. For example, a container 70 to be cooled may include a label or some other identifying indicia that has one or more thermochromatic inks 72 applied to the label. In the example of FIG. 6, the word BEER represents a label, in which one or more thermochromatic inks are applied to make the word BEER. The app provides an instruction 74 for the user to place the beverage inside a frame 76 that is the image area for the camera that is used to detect the presence of the thermochromatic inks If the user wishes to cancel a current selection of the beverage, the user may touch the cancel button 78 to restart the app.

Figure 7:
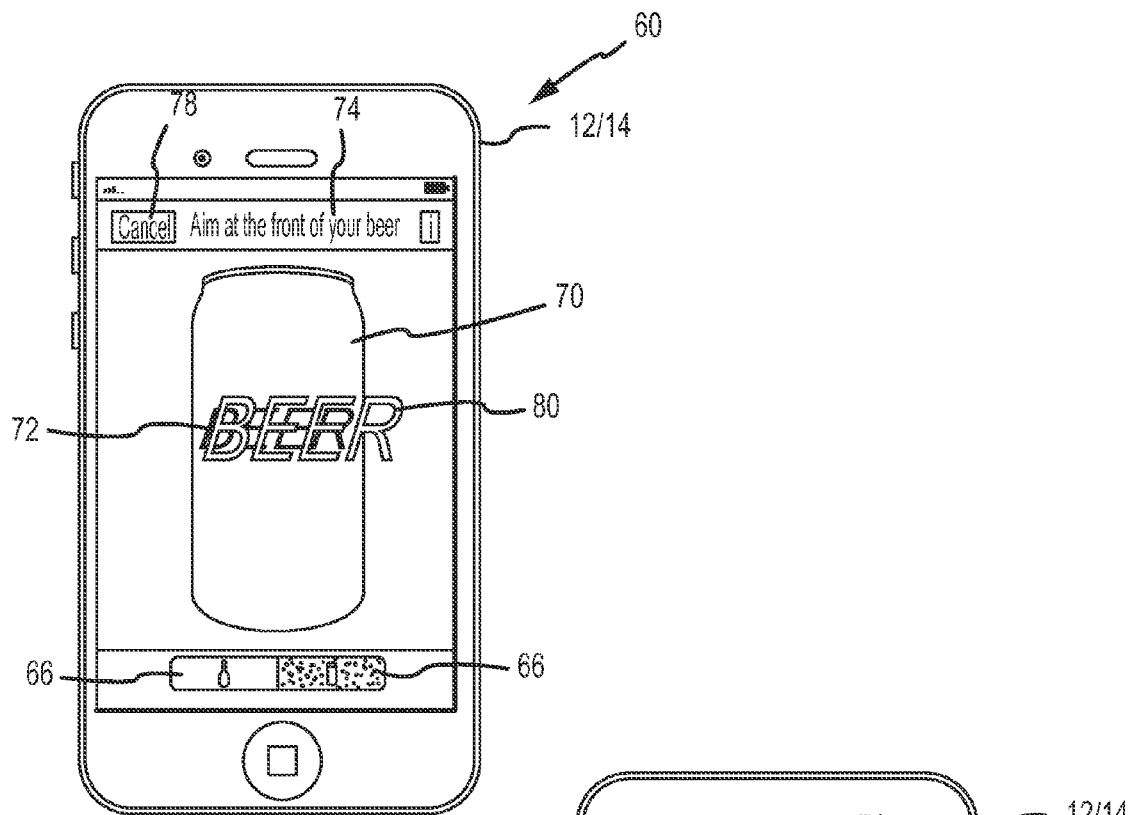

Referring to FIG. 7, once the image of the beverage has been placed within the frame area 76, the app provides yet further instructions 74 for the user to aim the camera at the front of the beverage so that the ink 72 on the label can be aligned with a control or calibration image 80 that is generated by the app in order to allow the camera to then trigger an image capture of the color(s) of the ink(s). More specifically, the particular ink pattern on the label is pre-designated so that the app recognizes the pattern or shape of the inks, and the calibration image 80 on the user interface is used to align the ink pattern for triggering an image capture by the camera. In the FIG. 7, the word "BEER" comprises the particular ink pattern. However, there are limitless numbers of other designs or patterns that can be used for ink patterns, such as designs corresponding to the particular brand of the beverage, and/or selected words that may include trademarks or other designs. The shape of the selected or known ink pattern is provided as the control or calibration image 80. To capture information by the camera imager, the user aligns the control image 80 with the ink pattern 72 and holds the alignment for a period of time. Then, the camera imager captures pixel information on the image of the ink pattern and compares this to a known image. Thus, by use of the control or calibration image, and aligning the image of the ink pattern with the control image, the imager can lock onto the ink pattern image and then generate an output of the captured image data so the software of the app can determine the container temperature. Capturing of the pixel information can be done in a number of ways based on the type of camera imager used and its ability to resolve colors in a captured image. One specific example can also include the user taking a picture of the ink pattern when the control image is aligned, and the software of the app then analyzes the captured pixel information using a Quick Response (QR) code reading protocol. QR code is a particular type of two dimensional or matrix barcode that has fast readability and large data storage capacity as compared to standard linear barcodes.

The user interface screen of FIG. 7 also provides the user with a container type selection buttons 66 so the user can easily transition between the selections of, for example, a bottle (left side) or can (right side).

Figure 8:
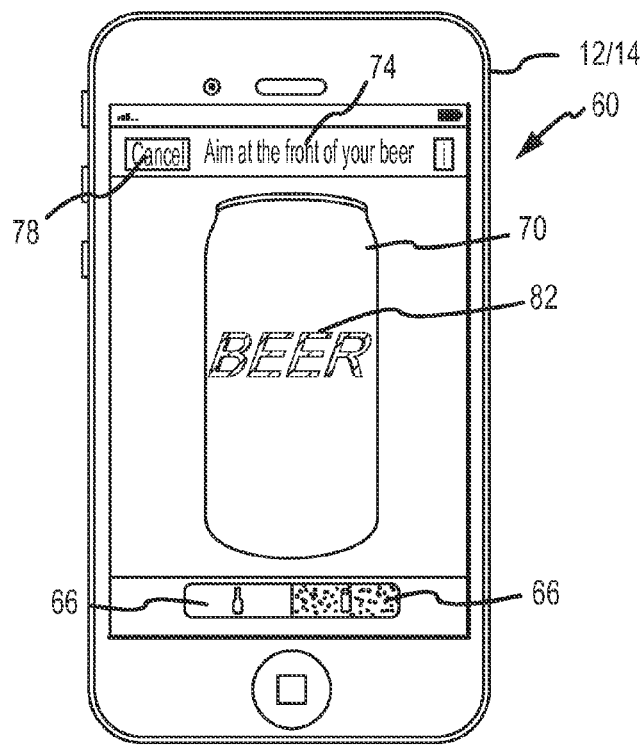

Referring to FIG. 8, this user interface represents the successful alignment of the ink pattern 72 with the image 80, and the app now generates an image of the container with the ink pattern as a captured image indication 82. This captured image indication 82 therefore confirms for the user that the image of the ink pattern has been successfully captured, and the app will now provide to the user an indication of when the beverage will be ready to be consumed. The captured image indication 82 can provide a display of the ink pattern in a selected color or some other visual indication that distinguishes the indication 82 from the original ink pattern colors.

Figure 9:
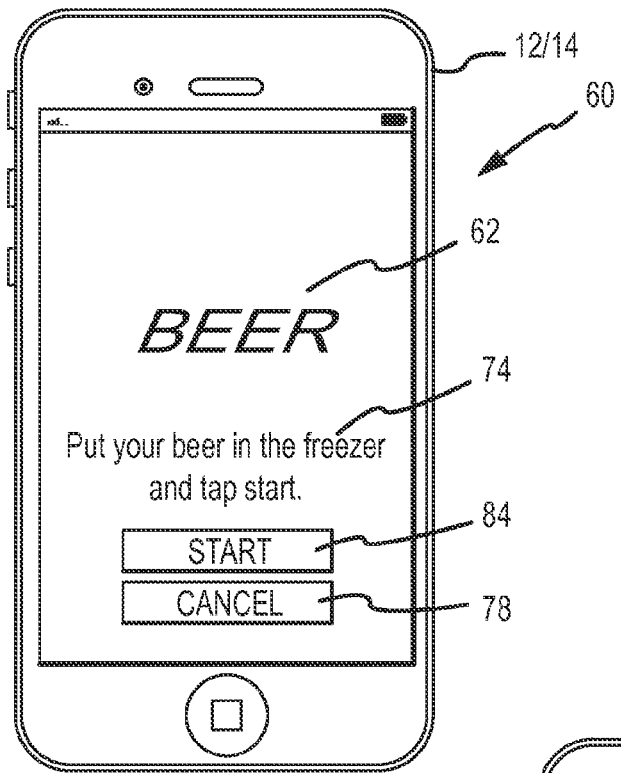

Accordingly, the next step in the process as shown in FIG. 9 is the generation of a user interface screen in which another instruction 74 instructs the user to place the beverage in the selected cooling device, and then tap the start button 84.

Figure 10:
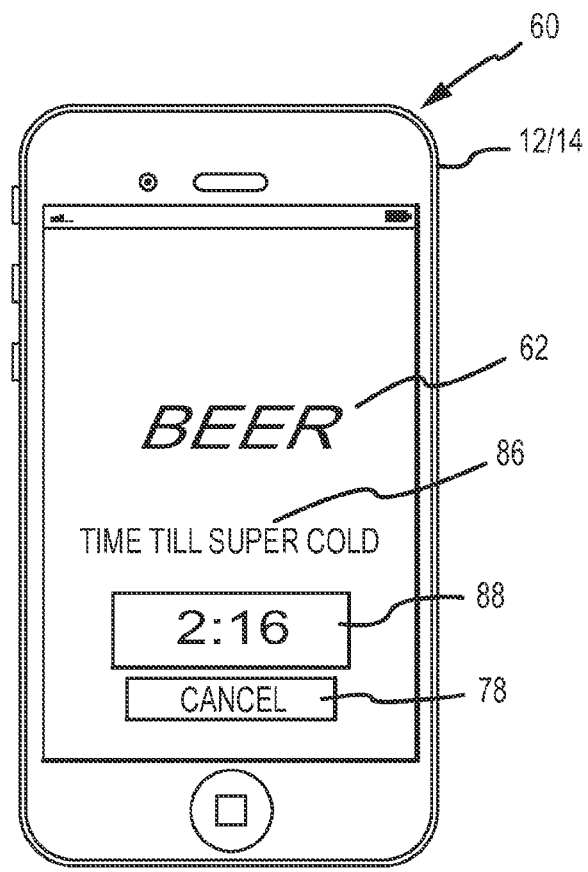

Now referring to FIG. 10, the next user interface screen provides the user with a timing message 86, along with a timing indicator 88 that provides the user the time in which the beverage will be cooled. In this example, the timer 88 indicates that it will take 2 hours and 16 minutes for the beverage to achieve the desired super cold temperature condition.

Figure 11:
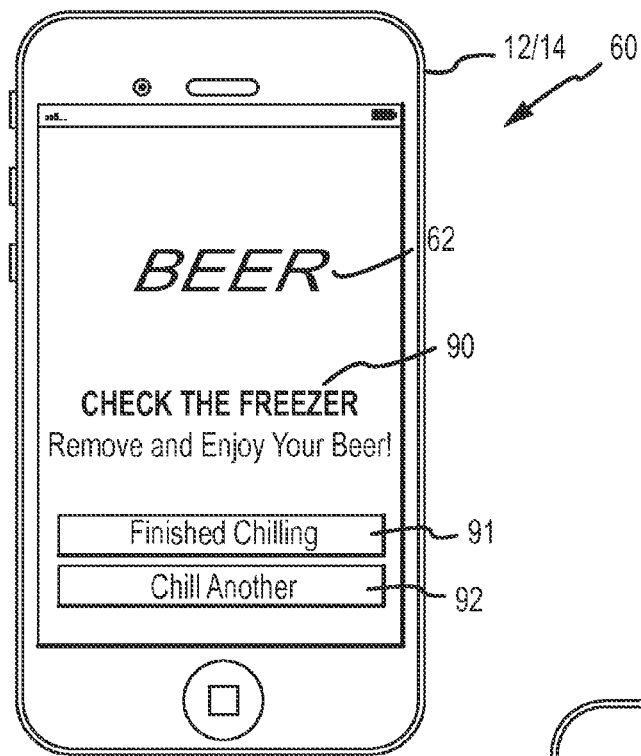

Now referring to FIG. 11, another user interface screen is provided in which a completion message 90 is generated indicating that the beverage is now ready for consumption. The completion message 90 may also include an audible or visual alarm, or both. At this point in time, the user may concur that the chilling has been successfully completed by pressing the finished chilling button 91 that terminates the completion message 90 and any alarm associated with the completion message. FIG. 11 also illustrates another option for the user to chill another beverage by selecting the button 92. If the user wishes to chill another beverage, activating the button 92 takes the user back to the user interface screen shown in FIG. 4 where the user again may choose the particular cooling device and other options for chilling a selected beverage.

Figure 12:
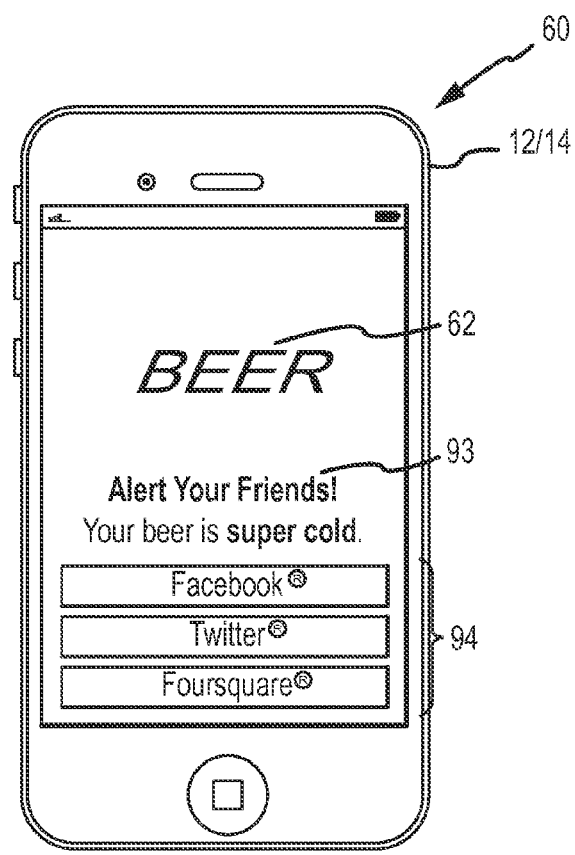

In yet another embodiment of the invention, referring to FIG. 12, a user interface screen 60 is provided in which the user may share information that the beverage is now ready to be consumed, shown as the social network message 93. In this case, the social network message 93 provides the user with three social network launching buttons 94. For example, the user could touch the Facebook® launch button 94 in which the user could then automatically generate an invitation to friends in the user's friendship network. Alternatively, the user may have already sent a social event invitation to the user's friends, and activating the button 94 could signify a triggering event, such as a reminder to now attend the social event, or to attend the social event at some other predetermined time. Accordingly, the timing of the cooling of a beverage can be used to generate a number of messages such as an initial invitation, a follow-up message instructing friends to now move to attend the event, or otherwise to remind invitees that the social event is to occur at a future time. Particularly for those friends that also enjoy the same type or types of beverages that have been cooled to their optimum temperatures, this provides an additional means for the user to take advantage of the social networking sites to set and confirm a social event.

Now referring to FIG. 13, an example table of temperature information is provided that may set the basis for determining when a beverage is ready for consumption based upon the type of beverage, type of beverage container, and size of the container. More specifically, the FIG. 13 illustrates a table in which data has been developed for cooling of the beverage by a freezer which may hold a temperature average of 0° F. during normal operation. In the table, example types of beverage containers are shown including a 12 oz. can, a 12 oz. bottle, a 16 ounce aluminum pint, a 16 oz. can, and a 24 oz. can. For each of these types of containers, temperature information is provided to include the start or original temperature of the beverage, and the desired end point temperature. The table also provides the estimated time in minutes it will take for the beverage to achieve the desired end temperature. For example, if a 12 oz. can of the beverage has a start temperature of 70° F. and the desired end temperature is 38° F., it will take approximately 43 minutes for the freezer to chill this beverage. For a 16 oz. can, assuming it has an initial temperature of 90° F. and the user wishes to chill the beverage to a super-cooled temperature of 27° F., it will take approximately 117 minutes for this desired cooling to take place.

Figures 14, 15:
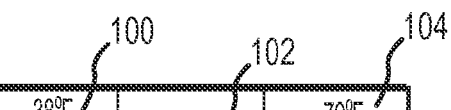
FIG. 14 is another table of information showing recommended set times derived from the temperature table of FIG. 13, and again this table comprising additional data that can be stored and used by the app of the invention.
FIG. 15 is a temperature-color correlation table showing an example of a three color ink combination that enables detection of the state of the beverage by a camera of a mobile communication device, again this table comprising yet additional data that can be stored and used by the app of the invention.

Multiple databases can be generated for other types of cooling devices and beverages regarding the time it takes to chill the beverage from a range of starting temperatures to a range of desired end temperatures. In the example of FIG. 13, there are two basic end temperatures listed. Namely, a cooled beverage condition of 38° F. and another cooled condition of 27° F. However, it should be understood that other starting and end temperatures can be generated in a table, depending upon how detailed the device app is desired in terms of its ability to provide timing information for ranges of starting and ending temperatures. It should be noted for the cooled condition at 27° F. that this temperature corresponds to a temperature just above the freezing point of the beverage being evaluated. For example for many malt beverages, the freezing point may be just below 27° F. and therefore data could be established for Now referring to FIG. 14, from the example data in FIG. 13, recommended set times can be established for determining how long the timer should run in the app to communicate to the user that the beverage is ready for consumption. In the example of FIG. 14, the recommended set times are provided for the time to reach the 38 degrees F. temperature. The table provides two types of selectable set times: one for a group of containers in the form of a set time range, and another for a single set time per type of beverage. For the set time range, this data could for example cover the range of set times for the 12 oz can and 12 oz bottle. Thus, the app can establish a set time within the range for when the timer should time-out based on either user selected criteria, or criteria pre-designated by the app itself. Each of the set times are established to ensure the beverage to be cooled does not freeze and therefore, a factor of safety calculation can be added to the set times as desired. The recommended set times as appearing in the FIG. 14 can correspond to the timer values presented to the user, shown as the timer 88 in FIG. 10.

Now referring to FIG. 15, a temperature-color correlation chart is shown with an example of a three color ink combination, and how therefore the camera of the user's mobile device may capture color information as an indication of temperature. More specifically, the FIG. 15 illustrates the use of three different inks that are activated at different temperatures. The first ink can be a "super cold" color ink, shown at column 100. The second ink could be a "cold" color ink shown at column 102. The third ink is shown in the table as the "room temperature" color ink in column 104. The super cold color ink would change color from clear to the pre-determined color around 38 F. Similarly, the cold color ink could be an ink that is activated at approximately 42° F., while the room temperature color ink could be activated at approximately 70° F. Still referring to FIG. 15, it is shown that at 90° F., the room temperature color ink is clear or has no color. At 70° F. however, it has a color as well as at all temperatures below 70° F. For the cold color and super cold colors, the table also shows the different temperature ranges at which these two inks will change from clear to colored. Each of the inks can have a separate and distinguishable color that is detectable by the camera image. For example, the three color schemes could include thermochromatic inks that each has a different color, such as the primary colors blue, green and red. The FIG. 15 therefore provides discrete color indications for different inks that can be recorded as corresponding to the start temperatures of the beverage. From a recordation of the starting beverage temperature as captured by the camera, the app is able to correlate the color information into an estimated start temperature of the beverage. Then using the set times as set forth in the example of FIG. 14, the app establishes the timer displayed to the user.

Although the FIG. 15 illustrates 3 separate thermochromatic inks and different activation temperatures for each, it should be understood that other combinations of inks can be used to provide greater or lesser capabilities to distinguish temperature ranges for a beverage. For example, in some apps it may only be necessary to have one or two thermochromatic inks which provide starting temperature information of a beverage, while in other circumstances; it may be desirable to have more exact information about the starting temperature of the beverage for purposes of generating recommended set times.

In addition to thermochromatic inks, it is also contemplated that a number of other different types of temperature sensitive inks or light sensitive inks can be used to initiate the timer, or to otherwise add functionality to the app in terms of the app communicating the state of the beverage to the user. For example, other types of inks that could be used include both encapsulated and liquid crystal thermochromatic inks, photochromatic inks, infrared inks, luminescent inks (such as black light, or glow/optical brighteners), hydro-chromatic inks, time developing inks, iridescent (reflective) inks, lenticular inks, or holographic inks, or light detecting inks.

The invention has been described with respect to cooling of a beverage however in another embodiment, the invention also includes determining the state of a beverage in which a beverage is heated to a desired temperature. For beverages such as coffee and tea, some action is required to prepare and heat the beverage for consumption at a preferable temperature range. The information in the FIGS. 13-15 can also be developed for heating a beverage. For example, the type of data in FIG. 13 can be determined for heating a beverage with a known starting temperature and a desired ending temperature, and also considering factors such as the type and size of container. From this information, recommended set times can be established and can be placed in a tabular form similar to the FIG. 14. A temperature-color correlation table can also be developed and placed in a tabular form similar to FIG. 15 in which various combinations of inks can be used enabling detection of the state of the beverage by a camera of a mobile communication device.

Although the present invention has been set forth above with respect to one or more preferred embodiments, it should be understood that various other changes and modifications can be made to the invention commensurate with the scope of the claims appended hereto.

The invention claimed is:

1. A method of cooling a beverage to a desired temperature, comprising:
   providing a mobile communication device with an integral camera and a computer processor for running an app having functionality to determine when a selected beverage will reach the desired temperature;
   said app including data that categorizes a selected type of beverage, size of beverage, type of beverage container, type of cooling device in which the beverage is to be cooled, and starting and ending temperatures for a range of temperature conditions, said app generating an estimated time in which the beverage will be cooled to a selected ending temperature;
   providing a beverage container with a temperature indicating medium secured to the container;
   viewing an image of the container with the temperature indicating medium by a user interface screen of the mobile communication device;
   aligning the temperature indicating medium on the container with a calibration image generated by the app thereby registering the image for detection by an imager of the camera regarding a state of the temperature indicating medium;
   determining a start temperature from a state of the temperature indicating medium;
   running the app to determine when the beverage will be cooled;
   providing an input to the mobile communication device indicating that the beverage has been placed in the selected cooling device; and
   generating a signal by the mobile device indicating when the beverage is sufficiently cooled and therefore, when the beverage should be withdrawn from the cooling device.

2. A method, as claimed in claim 1, further including:
   providing a plurality of user interface screens displayed on the mobile communication device to handle functionality of the app, said user interface screens including at least user selections for the type of beverage container, the type of cooling device in which the beverage is to be cooled, and the size of the beverage.

3. A method, as claimed in claim 1, further including:
   generating a user interface on said mobile communication device enabling a user to choose a social network for conveying messages concerning the beverage that will be or has been cooled.

4. A method, as claimed in claim 1, further including:
   generating a user interface screen with a timer that provides an indication of the time in which it takes to cool the beverage to the desired temperature based on the image of the container with the temperature indicating medium.

5. A method, as claimed in claim 1, further including:
   analyzing a state of the temperature indicating medium by comparing a color of the temperature indicating medium with a color that corresponds to a particular temperature based upon a known activation temperature of the temperature indicating medium used.

6. A method, as claimed in claim 1, wherein:
   said temperature indicating medium includes a plurality of temperature indicating mediums, and wherein the image of the container includes a plurality of colors displayed by the mediums corresponding to a known temperature or temperature range.

7. A method, as claimed in claim 1, wherein:
   said temperature indicating medium is a thermochromatic ink.

8. A method, as claimed in claim 1, wherein:
   said temperature indicating medium is a plurality of different thermochromatic ink formulations.

9. A method, as claimed in claim 1, wherein:
   said temperature indicating medium is a plurality of thermochromatic inks, and wherein said thermochromatic inks have different activation temperatures to change from a substantially colorless state to a colored state.

10. A method, as claimed in claim 7, wherein:
    an activation temperature of the ink is about 43-45 degrees F.

11. A method, as claimed in claim 7, wherein:
    at least one activation temperature of said ink is approximately 38 degrees F.

12. A method, as claimed in claim 7, wherein:
    at least one activation temperature of said ink is approximately 70 degrees F.

13. A method, as claimed in claim 1, wherein:
    said temperature indicating medium is applied to a label of the beverage container.

14. A method, as claimed in claim 1, wherein:
    said viewing step further includes providing the calibration image on the user interface screen for aligning a shape of the temperature indicating medium with a corresponding shape of the calibration image, and changing an appearance of said calibration image when the camera has captured color information thereby enabling determination of a temperature of the beverage.

15. A communication device including an application for controlling the cooling or heating of a beverage to a desired temperature and communicating information concerning the beverage, said apparatus comprising:
    a wireless communication device having a processor, a software application installed in the communication device controlled by the processor, said application including instructions for enabling a user to determine the state of a beverage, and to select the desired end temperature by cooling of the beverage;
    said application further including a plurality of user interface screens that direct a user in determining characteristics of the beverage to be cooled or heated to include the size of container, type of container and type of beverage within the container, said application further including data reflective of recommended set times for cooling or heating of a selected beverage to include a consideration of a start temperature of the beverage, said application having functionality for detecting the start temperature of the beverage, including receiving data from an image captured by a camera integral with the mobile communication device, and said data corresponding to color information detected by an imager of the camera corresponding to one or more activation temperatures for temperature indicating mediums applied to the container; and
    wherein said application provides a color comparison between the detected color information and the one or more activation temperatures of the temperature indicating mediums which in turn correspond to a range of temperatures associated with heating or cooling the beverage to the desired temperature.

16. An application installed on a computing device for determining a state of the beverage and for communicating information regarding the state of the beverage to a user, said application comprising:

instructions for enabling a user to determine the state of a beverage, and to select the desired end temperature by cooling or heating of the beverage, said application further including a plurality of user interface screens generated on a display of the computing device that direct a user in determining characteristics of the beverage to be cooled or heated to include the size of container, type of container and type of beverage within the container, said application further including data reflective of recommended set times for cooling or heating a selected beverage to include a consideration of a start temperature of the beverage, said application having functionality for detecting the start temperature of the beverage, including receiving data from an image captured by an imager of an integral camera coupled to the computing device, and said data corresponding to color information detected by the imager corresponding to one or more activation temperatures for temperature indicating mediums applied to the container; and wherein said application provides a color comparison between the detected color information and the one or more activation temperatures of the temperature indicating mediums which in turn correspond to a range of temperatures associated with heating or cooling the beverage to the desired temperature.

17. A non-transitory computer-readable medium having stored thereon instructions that cause a computing device with an integral camera to execute a method, the instructions comprising:

instructions configured to receive a first predetermined input that represents an instruction to determine and reveal an application on a display of the computing device relating to determining the state of a beverage and when a beverage will reach a desired temperature;

instructions configured to receive a second predetermined input that represents an instruction to determine a type of device in which a temperature of a beverage will be changed to the desired temperature;

instructions configured to receive a third predetermined input that represents an instruction to determine a type and size of beverage container that holds the beverage;

instructions configured to receive a fourth predetermined input that represents an instruction to capture an image of a pattern on the beverage container, the pattern comprising a temperature indicating medium;

instructions configured to respond to alignment of the pattern on the container with a calibration image of the application thereby indicating registration of the pattern with the calibration image enabling a determination to be made as to a state of the temperature indicating medium;

instructions configured to respond to the second, third and fourth predetermined inputs that generates an output on the display of the computing device that provides an indication when the beverage will reach the desired temperature.

18. The computer-readable medium, as claimed in claim 17, wherein the temperature indicating medium includes a thermochromatic ink.

19. The computer-readable medium, as claimed in claim 17, wherein the first predetermined input includes an application for determining the state of a beverage and when a beverage will reach a desired temperature by cooling of the beverage.

20. The computer-readable medium, as claimed in claim 17, wherein the first predetermined input includes an application for determining the state of a beverage and when a beverage will reach a desired temperature by heating of the beverage.

\* \* \* \* \*